United States Patent
Kim et al.

(10) Patent No.: US 9,975,977 B2
(45) Date of Patent: May 22, 2018

(54) MULTIMODAL POLYOLEFIN RESIN HAVING HIGH MELT STRENGTH AND MOLDED PRODUCT PREPARED WITH THE SAME

(71) Applicant: DAELIM INDUSTRIAL CO., LTD., Seoul (KR)

(72) Inventors: Yong Kim, Daejeon (KR); Seung Tack Yu, Gyeonggi-do (KR); Byung Keel Sohn, Daejeon (KR); Yong Jae Jun, Daejeon (KR); Young Shin Jo, Daejeon (KR); Dong Sik Park, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days. days.

(21) Appl. No.: 15/494,802

(22) Filed: Apr. 24, 2017

(65) Prior Publication Data

US 2017/0306069 A1  Oct. 26, 2017

(30) Foreign Application Priority Data

Apr. 26, 2016 (KR) .................. 10-2016-0050638

(51) Int. Cl.
| | | |
|---|---|---|
| *C08F 210/16* | (2006.01) | |
| *C08F 4/6592* | (2006.01) | |
| *C08F 10/02* | (2006.01) | |
| *C08F 4/659* | (2006.01) | |
| *C08L 23/08* | (2006.01) | |

(52) U.S. Cl.
CPC ........ *C08F 210/16* (2013.01); *C08F 4/65912* (2013.01); *C08F 4/65916* (2013.01); *C08F 4/65925* (2013.01); *C08F 4/65927* (2013.01); *C08F 2500/05* (2013.01); *C08F 2500/11* (2013.01); *C08F 2500/12* (2013.01); *C08L 23/0815* (2013.01)

(58) Field of Classification Search
CPC  C08F 210/16; C08F 2500/05; C08F 2500/11; C08F 2500/12; C08F 4/65925; C08F 4/65927; C08F 10/02
USPC ........................................................ 526/119
See application file for complete search history.

(56) References Cited

U.S. PATENT DOCUMENTS

| | | |
|---|---|---|
| 4,461,873 A | 7/1984 | Bailey et al. |
| 4,659,685 A | 4/1987 | Coleman, III et al. |
| 4,808,561 A | 2/1989 | Welborn, Jr. |
| 4,937,299 A | 6/1990 | Ewen et al. |
| 5,183,867 A | 2/1993 | Welborn, Jr. |
| 5,266,544 A | 11/1993 | Tsutsui et al. |
| 5,395,810 A | 3/1995 | Shamshoum et al. |
| 5,539,076 A | 7/1996 | Nowlin et al. |
| 5,747,405 A | 5/1998 | Little et al. |
| 6,841,631 B2 | 1/2005 | Loveday et al. |
| 6,894,128 B2 | 5/2005 | Loveday et al. |
| 7,662,894 B2 * | 2/2010 | Hamed .................. C08F 10/02 502/113 |
| 8,088,704 B2 * | 1/2012 | Kolb ..................... C07F 7/006 502/103 |

FOREIGN PATENT DOCUMENTS

| | | |
|---|---|---|
| EP | 0676418 A1 | 10/1995 |
| EP | 0705848 A2 | 4/1996 |
| EP | 0747402 A1 | 12/1996 |
| EP | 0717755 B1 | 2/1999 |
| KR | 10-0981612 B1 | 9/2010 |
| KR | 10-0999543 B1 | 12/2010 |
| KR | 10-0999551 B1 | 12/2010 |
| KR | 10-2014-0071142 | 6/2014 |
| WO | 96/13532 A1 | 5/1996 |

OTHER PUBLICATIONS

Ethylene Polymers, HDPE, Encyclopedia of Polymer Science and Technology (J. Wiley & Sons, Inc.), vol. 2, 382-412, published online: Oct. 22, 2001.*

* cited by examiner

*Primary Examiner* — Fred M Teskin (74) *Attorney, Agent, or Firm* — Nath, Goldberg & Meyer; Jerald J. Meyer; Tanya E. Harkins (57) ABSTRACT

Multimodal polyolefin resin having superior characteristics including moldability, mechanical strength, external appearance, melt strength and a polyolefin resin molded product meeting the requirements: (1) polymerized in the presence of at least two different metallocene compounds as catalysts; (2) matrix index of 2 or less and a melt strength of 4.0 Force (cN) or greater at 190° C.; (3) melt flow index (MIP, 190° C., 5.0 kg load condition) of 0.01 to 5.0 g/10 min; (4) ratio (Mw/Mn, MWD) of weight average molecular weight (Mw) to number average molecular weight (Mn) of 5-35 as measured by gel permeation chromatography; and (5) bimodal or multimodal peaks in a weight average molecular weight distribution measured by gel permeation chromatography, wherein the height ratio of two peaks (the ratio of the height of low molecular weight peak to the height of high molecular weight peak) is 0.7-3.

12 Claims, 2 Drawing Sheets

MULTIMODAL POLYOLEFIN RESIN HAVING HIGH MELT STRENGTH AND MOLDED PRODUCT PREPARED WITH THE SAME

FIELD OF THE INVENTION

This invention relates to a multimodal polyolefin resin and a molded product prepared with the same, and more particularly, to a multimodal polyolefin resin having superior characteristics such as moldability, mechanical strength, external appearance, melt strength and so on and a polyolefin resin molded product.

BACKGROUND OF THE INVENTION

In order to use a polyolefin resin for a molded product, the polyolefin resin should have superior toughness, strength, environmental stress, crack resistance and melt strength etc. Such characteristics of polyolefin using Ziegler-Natta and metallocene catalysts can be easily improved by increasing molecular weight of the polyolefin resin (polymer), however, this disadvantageously deteriorates the moldability of the polyolefin resin. In order to compensate for the disadvantages of such a polyolefin resin, polyolefin resins having different physical properties are used in combination, but there is a disadvantage that defective appearance of the molded product may occur. Due to such disadvantage of polyolefin resin, it is preferable to use a polyolefin resin having uniform physical property while adjusting the structure of the polymer or using a suitable processing aid, rather than using a mixture of polyolefin resins each having different physical properties. However, generally the polyolefin resin prepared with Ziegler-Natta and metallocene catalyst has narrow molecular weight distribution Thus, if used alone, various problems may occur. When the polymer having broad molecular weight distribution or multimodal molecular weight distribution is used, the moldability of the polyolefin resin can be improved with maintaining characteristics of toughness, strength, environmental stress, crack resistance and melt strength etc., thereby solving the disadvantage of the polyolefin resin having narrow molecular weight distribution.

The polyolefin having multimodal molecular weight distribution is a polyolefin containing at least two components each having different molecular weight, and for example, includes a high molecular weight component and a low molecular weight component in relatively proper proportions. Many studies have been conducted for the preparation of a polyolefin having broad molecular weight distribution or multimodal molecular weight distribution. One method among them is a post-reactor process or a melting blending process in which polyolefin having at least two different molecular weights are blended before or during the processing of the polyolefin. For example, U.S. Pat. No. 4,461,873 discloses a blending method of physically bending two different kinds of polymers for preparing a bimodal polymer blend. When such a physical blending method is used, it is liable to produce a molded form having high gel component, a product appearance is deteriorated owing to the gel component, and thus the polyolefin cannot be used for the films. Further, the physical blending method requires a complete uniformity, so there is a disadvantage of the preparing cost being increased.

Another method for preparing polyolefin having multimodal molecular weight distribution, for example bimodal molecular weight distribution is to use a multistage reactor which includes two or more reactors. In the multistage reactor, a first polymer component having one molecular weight distribution among two different molecular weight distribution of the bimodal polymer, is prepared in a certain condition at a first reactor, the first polymer component prepared is transferred to a second reactor, and then a second polymer component having different molecular weight distribution from that of the first polymer component, is prepared in a different condition from that of the first reactor, at the second reactor. The above-mentioned method solves the problems relating to the gel component, but it uses the multistage reactor, so the production efficiency may be decreased or the production cost may be increased. Also, when the high molecular weight components are prepared in the first reactor, the low molecular weight components are not prepared in the second reactor and thus the finally manufactured polyolefin particles may be made only by the high molecular weight components.

Still another method for preparing polyolefin having broad molecular weight distribution or multimodal molecular weight distribution is to polymerize the polyolefin by using a mixture of catalysts in a single reactor. Recently, in the pertinent art, the various attempts have been made for producing polyolefin having broad molecular weight distribution or multimodal molecular weight distribution, by using two or more different catalysts in a single reactor. In this method, the resin particles are uniformly mixed in a level of sub-particles, thus the resin components each having different molecular weight distribution exists in a single phase. For example, U.S. Pat. Nos. 6,841,631 and 6,894,128 disclose a method for preparing polyethylene having bimodal or multimodal molecular weight distribution by using a metallocene-type catalyst comprising at least two metal compounds and the usage of the polyethylene for manufacturing films, pipes, hollow molded articles and so on. Polyethylene produced in this way has a good processability, but the dispersed state of the polyethylene component in the molecular weight per unit particle is not uniform, so there are disadvantages of rough appearance and unstable physical properties even in relatively good processing conditions.

U.S. Pat. No. 4,937,299 discloses a method for preparing polyolefin by using a catalyst system comprising at least two kinds of metallocenes each having different reactivity ratio with respect to monomer to be polymerized. U.S. Pat. No. 4,808,561 discloses a method for preparing olefin polymerization supported catalyst by reacting metallocene with alumoxane in the presence of a carrier. The metallocene is supported in the carrier to form solid power catalyst. As the carrier, inorganic oxide materials such as silica, alumina, silica-alumina, magnesia, titania, zirconia and the mixture thereof, and resinous materials such as polyolefin (for example, finely divided polyethylene) can be employed, and the metallocenes and alumoxanes are deposited on the dehydrated carrier material.

Generally, since the polymer prepared with Ziegler-Natta catalyst alone or metallocene catalyst system has a narrow molecular weight distribution, it is not made to prepare the satisfactory polyolefin which has a multimodal molecular weight distribution or broad molecular weight distribution. Accordingly, in the related art, a method has been known for preparing a bimodal resin by using a mixture catalyst system containing Ziegler-Natta catalyst and metallocene catalyst components. The mixture catalyst system typically includes a combination of heterogeneous Ziegler-Natta catalysts and homogeneous metallocene catalyst. The mixture catalyst system is used for preparing the polyolefin having a broad molecular weight distribution or bimodal molecular weight distribution, to adjust the molecular weight distribution and polydispersity of the polyolefin.

U.S. Pat. No. 5,539,076 discloses a mixture catalyst system of metallocene/non-metallocene for preparing a specific bimodal high-density copolymer. The catalyst system is supported by an inorganic carrier. The carrier such as silica, alumina, magnesium-chloride and the mixture catalyst of Ziegler-Natta and metallocene are disclosed in U.S. Pat. No. 5,183,867, European publication No. 0676418A1, European Patent No. 0717755B1, U.S. Pat. No. 5,747,405, European Patent No. 0705848A2, U.S. Pat. No. 4,659,685, U.S. Pat. No. 5,395,810, European patent No. 0747402A1, U.S. Pat. No. 5,266,544 and WO 9613532A1 etc. The mixture catalyst of Ziegler-Natta and metallocene supported has relatively low activity than single uniform catalyst, so it is difficult to prepare polyolefin having properties suitable for a specific use. In addition, since polyolefin is prepared in a single reactor, the gel which is generated in the blending method may be produced, it is difficult to insert comonomer to high molecular weight components part, the form of polymer produced may be poor and further two polymer components may not be uniformly mixed, so the quality control of the produced polyolefin may be difficult.

Journal of Rheology, 57 (2), 393-406 (2013) discloses that when a polyethylene resin having a multimodal molecular weight distribution is extruded, the polymer chains and the low molecular weight chains are separated from each other due to the difference in elastic energy between the bimodal molecular weights, so that each component therein is not uniformly mixed. This can lead to problems of reducing physical properties and surface defects such as melt fracture, gel formation, etc.

SUMMARY OF THE INVENTION

It is an object of the present invention to provide a multimodal polyolefin resin containing a medium molecular weight polymer which minimizes an elastic energy difference between a low molecular weight chain and a high molecular weight chain when extruding and molding the multimodal polyolefin resin.

It is another object of the present invention to provide a multimodal polyolefin resin having good resin properties and processability and superior shear response (SR), viscosity ratio (shear thinning index, STI) and melt strength as required for film-moldability and process stability, and having high productivity due to low extrusion load and high extrusion quantity during the molding process.

It is another object of the present invention to provide a multimodal polyolefin resin molded product having an appropriate molecular weight range and molecular weight distribution to realize uniform distribution of chains and having good appearance and mechanical strengths.

To achieve the objects of the present invention, there is provided a polyolefin resin satisfying all the following requirements (1) to (5):

(1) being polymerized in the presence of at least two different metallocene compounds as a catalyst;

(2) having a matrix index of 2 or less and a melt strength of 4.0 force (cN) or greater at 190° C., where the matrix index is calculated according to the following equation 1;

(3) having a melt flow index (MIP, 190° C., 5.0 kg load) of 0.01 to 5.0 g/10 min;

(4) having a ratio (Mw/Mn, MWD, molecular weight distribution) of weight average molecular weight (Mw) to number average molecular weight (Mn) in the range from 5 to 35 as measured by gel permeation chromatography (GPC); and (5) having a height ratio of the two peaks (i.e., the ratio of the height (content) of low molecular weight peak to the height (content) of high molecular weight peak) in the range of 0.7 to 3, $$\text{Matrix Index}=(A+B-C)/C \qquad \text{[Equation 1]}$$

where A is the height (content) of a peak having the lowest molecular weight in the molecular weight distribution graph measured by gel permeation chromatography (GPC); B is the height (content) of a peak having the highest molecular weight; and C is the height of the deepest valley between the two peaks. The matrix index approaches 1 as the medium molecular weight polymer fills up (namely, increases) between the bimodal (two) molecular weight polymers.

The multimodal polyolefin resin according to the present invention has a molecular weight distribution having at least bimodal molecular weight distribution, wherein a medium molecular weight polymer fills between the peaks of the bimodal molecular weight distribution curve. Thereby, the multimodal polyolefin resin has high melt strength and shear thinning ratio (STR) through good matrix index value.

Further, the multimodal polyolefin resin of the present invention introduces a polymer having a relatively medium molecular weight to minimize the elastic energy and make high molecular weight chain and low molecular weight chain uniformly mixed together, thereby providing a polyolefin resin molded product excellent in mechanical strength, moldability, appearance, and rheological properties in the process of forming films and a multimodal polyolefin resin molded product with high productivity due to low extrusion load and high extrusion quantity during the process.

DETAILED DESCRIPTION OF THE INVENTION

Hereinafter, the present invention will be described in detail with reference to the accompanying drawings. In the following description, upon necessity, the polyolefin resin is called just as polymer or polyolefin or also as ethylene-based polymer, polymer, high molecule, or olefin polymer.

The multimodal polyolefin resin of the present invention has an appropriate molecular weight distribution, for example, bimodal or multimodal molecular weight distribution. It is excellent in moldability, particularly suited to blow molding, extrusion molding and film molding, very good in the rheological properties as a resin, and highly stable during the process of forming films.

The polyolefin resin of the present invention satisfies all the following requirements (1) to (5) or the requirements (1) and (4) to (6), to secure good properties.

(1) The polyolefin resin is polymerized in the presence of at least two different metallocene compounds as catalysts.

(2) The matrix index calculated according to the following Equation 1 is 2 or less, preferably 1 to 1.8, and more preferably 1 to 1.7; and the melt strength measured at 190° C. is 4.0 Force (cN) or more, preferably 4 to 5 Force (cN), and more preferably 4 to 4.7 Force (cN). In this regard, the matrix index (MTI) is an index representing the content of the medium molecular weight polymer filled between the high molecular weight polymer and the low molecular weight polymer; and the melt strength is measured with a gottfert Rheometer (RHEOTESTER-2000) and a RHEOTENS71.97. Using a capillary tube having 10 mm length and 1.0 mm diameter, 15 to 20 g of a pellet was used to perform a measurement at 230° C., a piston speed of 0.087 mm/s, a wheel speed of 15.0 mm/s, and a wheel acceleration of 5 mm/s². An average of at least five measurements was determined.

$$\text{Matrix Index} = (A+B-C)/C \quad \text{[Equation 1]}$$

In the Equation 1, A is the height (dw/d log M) of a peak having the lowest molecular weight in the molecular weight distribution graph measured by gel permeation chromatography (GPC); B is the height (dw/d log M) of a peak having the highest molecular weight; and C is the height of the deepest valley between the two peaks. The matrix index approaches 1 as the medium molecular weight polymer fills up between the bimodal molecular weight polymers. In this regard, w is the weight; M is the molecular weight; and dw/d log M is the weight fraction of the polymer having the corresponding molecular weight (log M).

(3) The melt flow index (MIP, 190° C., 5.0 kg load) is 0.01 to 5.0 g/10 min, preferably 0.05 to 3.0 g/10 min, as measured at 190° C. according to ASTM D1238 standards.

(4) The ratio (Mw/Mn, MWD, molecular weight distribution) of weight average molecular weight (Mw) to number average molecular weight (Mn) is 5 to 35, preferably 10 to 30. The measurement is performed using gel permeation chromatography (GPC, Polymer Laboratory Inc. 220 Product), where two Olexis and one Guard are used as separation columns, and the column temperature is maintained at 160° C. A standard polystyrene set supplied by Polymer Laboratory Inc. is used for calibration, and the eluent solution as used herein is trichlorobenzene containing 0.0125 wt % of dibutyl hydroxyl toluene (BHT) as an antioxidant. The specimen is prepared at ratio of 0.1 to 1 mg/ml and injected in an amount of 0.2 ml for 30 minutes. The measurement is performed at a constant pump flow rate of 1.0 ml/min for 30 to 60 minutes. Easical A and Easical B (Agilent Inc.) are used as polystyrene standard substances. After universal calibration and then reduction with polyethylene, the measurements are performed to determine number average molecular weight (Mn), weight average molecular weight (Mw), and z average molecular weight (Mz). The detector as used herein is an RI (Refractive Index) detector. The molecular weight distribution (Mw/Mn) is the ratio of weight average molecular weight to number average molecular weight.

(5) In the weight average molecular weight distribution measured by gel permeation chromatography (GPC), bimodal or multimodal peaks appear, where the height ratio of the two peaks (i.e., composition ratio, ratio of the height of low molecular weight peak (content. amount) to the height of high molecular weight peak (content. amount)) is 0.7 to 3, preferably 1 to 2.

(6) In the correlation function of melt strength (Y) and matrix index (X), $Y \geq -0.74X+5.3$. The matrix index and the melt strength are measured in the same manner as described in (2). The correlation function is a function obtained by schematizing the calculated value of the matrix index (X) analyzed in the Equation 1 and the actual data of the melt strength (Y) (Refer to Table 4 and Comparative Examples 1 to 13) according to a program (Origin Pro 8.6).

An analysis of the molecular weight of the polyolefin resin according to the present invention using gel permeation chromatography (GPC) shows at least two peaks. The peak ($M_{LP}$) for the lowest molecular weight preferably appears at 10,000 to 100,000 g/mol, more preferably 10,000 to 60,000 g/mol. The peak ($M_{HP}$) for the highest molecular weight preferably appears at 300,000 to 3,000,000 g/mol, more preferably 400,000 to 2,500,000 g/mol. The polyolefin forming the peak ($M_{HP}$) of the highest molecular weight acts (functions) to enhance the mechanical properties of the polymer resin. The polyolefin forming the peak ($M_{LP}$) of the lowest molecular weight acts (functions) to improve the moldability of the polymer resin. Further, the polyolefin resin forming the medium region ($M_{MP}$) minimizes the chain separation caused by the elastic energy difference between the low molecular weight polymer chain and the high molecular weight polymer chain during the extrusion process, and makes the distribution of chains more uniform. This leads to the excellence of the resin in regards to appearance, mechanical strength, and rheological properties to prevent the surface defects of the molded bodies and increase the dimensional stability during the process of forming films. Accordingly, the molecular weight of the polyolefin resin out of the defined range may cause deteriorate in the moldability of the polyolefin resin or in the properties of the molded products.

As the olefin monomer for forming the polyolefin resin according to the present invention, linear aliphatic olefins having 2 to 12 carbon atoms, preferably 2 to 10 carbon atoms, cyclic olefins having 3 to 24 carbon atoms, preferably 3 to 18 carbon atoms, dienes, trienes, styrenes, and the like can be used. Examples of the linear aliphatic olefin include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene and the like. Examples of the cyclic olefin include cyclopentene, cyclobutene, cyclohexene, 3-methylcyclohexene, cyclooctene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene, ethylene norbornene and the like. As the examples of the dienes and trienes, a polyene having 4 to 26 carbon atoms and having two or three double bonds is preferable, and specifically 1,3-butadiene, 1,4-pentadiene, 1,4-hexadiene, 1,5-hexadiene, 1,9-decadiene, 2-methyl-1,3-butadiene can be exemplified. Examples of the styrene include styrene or styrene substituted with an alkyl group having 1 to 10 carbon atoms, an alkoxy group having 1 to 10 carbon atoms, a halogen group, an amine group, a silyl group, a halogenated alkyl group or the like. The olefin monomers may be homopolymerized or alternating, random, or block copolymerized.

For example, the polyolefin resin according to the present invention is a homopolymer or a copolymer of an olefin monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicyclopentadiene, 1,3-butadiene, 1,4-pentadiene, 1,4-hexadiene, 1,5-hexadiene styrene, α-methylstyrene, divinylbenzene and 3-chloromethylstyrene. Further, in the polyolefin resin according to the present invention, it is preferable that the main component is selected from the group consisting of ethylene, propylene, and mixtures thereof and as the remaining auxiliary component, 0.01 to 3.0% by weight of α-olefin having 4 to 10 carbon atoms, for example 6 to 8 carbon atoms, is contained. Here, the content of the comonomer (α-olefin) can be measured by 13C-NMR.

The polyolefin resin according to the present invention can be used not only for the production of various molded articles such as blow molded articles, inflated molded articles, cast molded articles, extruded laminated molded articles, extrusion molded articles such as pipe or mold release, foamed molded articles, injection molded articles, sheets, films etc, but also for the production of fibers, monofilaments, nonwoven fabrics and the like. Particularly, the polyolefin resin of the present invention is useful for producing a blow molded article, an extrusion molded article such as a pipe or its variant, or a film-formed article. The polyolefin resin according to the present invention can be crosslinked in the molding process. The molded product can be a molded composite (laminate) whose one part is made of the polyolefin according to the present invention and whose another part is made of different resin. Conventional additives, modifiers and the like can be further included in order to improve physical properties of the molded articles.

Preferably, the polyolefin resin of the present invention further satisfies the following requirements (7), (8) and (9).

(7) The density (d) is 0.930 to 0.965 g/cm$^3$, preferably 0.935 to 0.960 g/cm$^3$, as measured according to ASTM 1505 and ASTM D 1928.

(8) The peak ($M_{LP}$) for the lowest molecular weight in the molecular weight distribution appears in the molecular weight range of 10,000 to 100,000, preferably 10,000 to 60,000, according to gel permeation chromatography (GPC) measurement.

(9) The peak ($M_{HP}$) for the highest molecular weight appears in the molecular weight range of 300,000 to 3,000,000, preferably 400,000 to 2,500,000, according to the gel permeation chromatography (GPC).

As for the polyolefin resin of the present invention, the weight average molecular weight (Mw, measured by GPC) is 100,000 to 400,000, preferably 150,000 to 300,000. The high-load melt flow index (MIF, 190° C., 21.6 kg/10 min load condition) is 0.15 to 250, preferably 1 to 120. The melt flow index ratio (shear response (SR), F/P, the ratio of high-load melt flow index (MIF) to melt flow index (MIP)) is 15 to 50, preferably 20 to 40. The viscosity ratio (shear thinning index; STI) is 45 to 100, preferably 50 to 70. The modulus ratio index (MRI) is 20 to 200, preferably 30 to 100.

The high-load melt flow index (MIF) is measured at 190° C. according to ASTM D1238. The viscosity ratio (shear thinning index; STI) is determined with a Rhometrics mechanical spectrometer (RMS-800) using the following Equation 2. The measurement is performed with a parallel plate having a diameter of 25 mm at 190° C. The modulus ratio index (MRI) is determined using the following Equation 3.

$$STI = \eta_{0.1}/\eta_{100} \qquad [Equation\ 2]$$

where $\eta_{0.1}$ is a viscosity at deformation rate of 0.1 rad/s; and $\eta_{100}$ is a viscosity at deformation rate of 100 rad/s.

$$MRI = G'_{100}/G'_{0.1} \qquad [Equation\ 3]$$

where $G'_{100}$ is a storage modulus at deformation rate of 0.1 rad/s; and $G'_{0.1}$ is a storage modulus at deformation rate of 100 rad/s.

The polyolefin resin according to the present invention can be prepared by a proper combination of catalyst compounds. The catalyst components include a at least one first organo-transition metal compound represented by following Formula 1 which is a catalyst for producing a relatively low molecular weight polymer, at least one second organo-transition metal compound represented by following Formula 2 which is a catalyst for producing a relatively medium molecular weight polymer, at least one third organo-transition metal compound represented by following Formula 3 which is a catalyst for producing a relatively medium molecular weight polymer, at least one fourth organo-transition metal compound represented by following Formula 4 which is a catalyst for producing a relatively high molecular weight polymer and aluminoxanes.

$$(L^1)(L^2)(X^1)(X^2)M^1 \qquad [Formula\ 1]$$

$$(L^3)(L^4)(X^3)(X^4)M^2 \qquad [Formula\ 2]$$

$$(L^5\text{-}Q^1_n\text{-}L^6)(X^5)(X^6)M^3 \qquad [Formula\ 3]$$

$$(L^7\text{-}Q^2_n\text{-}L^8)(X^7)(X^8)M^4 \qquad [Formula\ 4]$$

In Formulas 1, 2, 3 and 4, $M^1$, $M^2$, $M^3$ and $M^4$ each is independently titanium (Ti), zirconium (Zr), or hafnium (Hf), $L^1$, $L^2$, $L^3$, $L^4$, $L^5$, $L^6$, $L^7$ and $L^8$ each is independently a cyclic hydrocarbyl group having 5 to 30 carbon atoms and having at least two conjugated double bonds, and $X^1$, $X^2$, $X^3$, $X^4$, $X^5$, $X^6$, $X^7$ and $X^8$ each is independently a halogen atom or a hydrocarbyl group. Also, $Q^1$ and $Q^2$ each is independently a silane group or a hydrocarbyl group containing a substituent, and n is an integer of 1 to 5.

First, the organo-transition metal compounds represented by Formulas 1 and 2 will be described in detail. $M^1$ and $M^2$ each in the formulas 1 and 2 is titanium (Ti), zirconium (Zr), or hafnium (Hf). $L^1$, $L^2$, $L^3$ and $L^4$ each is independently a substituted or unsubstituted cyclic hydrocarbyl group having 5 to 30 carbon atoms and having at least two conjugated double bonds, wherein the conjugated double bond is preferably 2 to 6, more preferably 2 to 5, and the number of carbon atoms of the cyclic hydrocarbyl group is preferably 5 to 15, more preferably 5 to 13. Examples of $L^1$, $L^2$, $L^3$ and $L^4$ include a cyclopentadienyl group, a substituted cyclopentadienyl group, an indenyl group, a substituted indenyl group, a fluorenyl group, a substituted fluorenyl group, a pentalene group, a substituted pentalene group and so on. The $L^1$, $L^2$, $L^3$ and $L^4$ may be partially substituted with 1 to 6 substituents, and the substituent may be hydrogen, an alkyl group having 1 to 20 carbon atoms, an alkenyl group having 1 to 20 carbon atoms, a cycloalkyl group having 3 to 20 carbon atoms, an aryl group having 4 to 20 carbon atoms, an alkylaryl group having 6 to 20 carbon atoms, a substituted or unsubstituted cyclopentadienyl group having 5 to 20 carbon atoms, a haloalkyl group having 1 to 20 carbon atoms, an alkoxy group having 1 to 20 carbon atoms, a haloaryl group having 6 to 20 carbon atoms, and a mixture thereof. The $X^1$, $X^2$, $X^3$ and $X^4$ each is an independently halogen atom or hydrocarbyl group, the halogen atom includes chlorine (Cl), fluorine (F), bromine (Br) and iodine (I), and the hydrocarbyl group is an alkyl group, a cycloalkyl group or an aryl group having 1 to 24 carbon atoms, preferably 1 to 12 carbon atoms, specifically an alkyl group such as methyl, ethyl, propyl, butyl or isobutyl, a cycloalkyl group such as cyclopentyl or cyclohexyl, or an aryl group such as phenyl.

Non-limiting examples of the organometallic compounds of transition metals represented by the above formulas 1 and 2 include bis(cyclopentadienyl) zirconium difluoride, bis(methylcyclopentadienyl) zirconium difluoride, bis(n-propylcyclopentadienyl) zirconium difluoride, bis(n-butylcyclopentadienyl) zirconium difluoride, bis(cyclopentylcyclopentadienyl) zirconium difluoride, bis(cyclohexylcyclopentadienyl) zirconium difluoride, bis(1,3-dimethylcyclopentadienyl) zirconium difluoride, bis(isobutylcyclopentadienyl) zirconium difluoride, bis(indenyl) zirconium difluoride, bis(fluorenyl) zirconium difluoride, bis(4,5,6,7-tetrahydro-1-indenyl) zirconium difluoride, bis(cyclopentadienyl) zirconium difluoride, bis(methylcyclopentadienyl) zirconium difluoride, bis(n-propylcyclopentadienyl) zirconium difluoride, bis(n-butylcyclopentadienyl) zirconium difluoride, bis(cyclopentylcyclopentadienyl) zirconium dichloride, bis(cyclohexylcyclopentadienyl) zirconium difluoride, bis(1,3-dimethylcyclopentadienyl) zirconium dichloride, bis(isobutylcyclopentadienyl) zirconium dichloride, bis(indenyl) zirconium dichloride, bis(fluorenyl) zirconium dichloride, bis(4,5,6,7-tetrahydro-1-indenyl) zirconium dichloride, bis(cyclopentadienyl) zirconium dibromide, bis(methylcyclopentadienyl) zirconium dibromide, bis(n-propylcyclopentadienyl) zirconium dibromide, bis(n-butylcyclopentadienyl) zirconium dibromide, bis(cyclopentylcyclopentadienyl) zirconium dibromide, bis(cyclohexylcyclopentadienyl) zirconium dibromide, bis(1,3-dimethylcyclopentadienyl) zirconium dibromide, bis(isobutyl cyclopentadienyl) zirconium dibromide, bis(indenyl) zirconium dibromide, bis(fluorenyl) zirconium dibromide, bis(4,5,6,7-tetrahydro-1-indenyl) zirconium dibromide, cyclopentadienyl zirconium trifluoride, cyclopentadienyl zirconium trichloride, cyclopentadienyl zirconium tribromide, cyclopentadienyl zirconium triiodide, methylcyclopentadienyl zirconium trifluoride, methylcylopentadienyl zirconium trichloride, methylcyclopentadienyl zirconium tribromide, methylcyclopentadienyl zirconium triiodide, butylcyclopentadienyl zirconium trifluoride, butylcyclopentadienyl zirconium trichloride, butylcyclopentadienyl zirconium tribromide, butylcyclopentadienyl zirconium triiodide, pentamethylcyclopentadienyl zirconium trifluoride, pentamethylcyclopentadienyl zirconium trichloride, pentamethylcyclopentadienyl zirconium tribromide, pentamethylcyclopentadienyl zirconium triiodide, indenyl zirconium trifluoride, indenyl zirconium trichloride, indenyl zirconium tribromide, indenyl zirconium triiodide, 4,5,6,7-tetrahydro indenyl zirconium trifluoride, 4,5,6,7-tetrahydro indenyl zirconium trichloride, 4,5,6,7-tetrahydro indenyl zirconium tribromide, 4,5,6,7-tetrahydro indenyl zirconium triiodide, methylindenyl zirconium trifluoride, methylindenyl zirconium trichloride, methylindenyl zirconium tribromide, methylindenyl zirconium triiodide, phenylindenyl zirconium trifluoride, phenylindenyl zirconium trichloride, phenylindenyl zirconium tribromide, phenylindenyl zirconium triiodide, fluorenyl zirconium trifluoride, fluorenyl zirconium trichloride, fluorenyl zirconium tribromide, fluorenyl zirconium triiodide and so on.

Next, the third and fourth organo-transition metal compounds represented by Formulas 3 and 4 will be described. $M^3$ and $M^4$ each in Formulas 3 and 4 is independently the same as the definitions of $M^1$ and $M^2$ in Formulas 1 and 2, and $L^5$, $L^6$, $L^7$ and $L^8$ each is independently the same as the definitions of $L^1$, $L^2$, $L^3$ and $L^4$. $X^5$, $X^6$, $X^7$ and $X^8$ each is independently the same as the definitions of $X^1$, $X^2$, $X^3$ and $X^4$. $Q^1$ and $Q^2$ each connects $L^5$ with $L^6$ and $L^7$ with $L^8$, and independently a silane group and a hydrocarbyl group, preferably an alkenyl group having 1 to 20 carbon atoms, an alkylsilane group having 1 to 20 carbon atoms, an arylsilyl group having 6 to 20 carbon atoms, an arylalkenyl group having 6 to 20 carbon atoms, an alkane having 1 to 20 carbon atoms, and specific examples of Q1 and Q2 include alkenyl groups such as methylidene, ethylene and isopropylidene, alkylsilane groups such as dimethylsilane; arylsilane groups such as diphenylsilane, arylalkenyl groups such as diphenylmethylidene, an arylsilyl group such as diphenylsilyl, an alkane such as ethane and so on.

The first organo-transition metal compound represented by Formula 1 is a catalyst component capable of forming a polymer having a relatively low molecular weight (for example, a weight average molecular weight of 50,000 or less), the second organo-transition metal compound represented by Formula 2 is a catalyst component capable of forming a polymer having a relatively medium molecular weight (for example, a weight average molecular weight of 50,000 to 200,000), the third organo-transition metal compound represented by Formula 3 is also a catalyst component capable of forming a polymer having a relatively medium molecular weight (for example, a weight average molecular weight of 50,000 to 200,000), and the fourth organo-transition metal compound represented by Formula 4 is a catalyst component capable of forming a polymer having a relatively high molecular weight (for example, a weight average molecular weight of 200,000 to 1,000,000). All of the compounds represented by the above formulas 1 to 4 can stably express polymerization even at a high temperature (about 80° C. or higher). As for the comonomer insertion ability, the catalyst component expressing a low molecular weight polymer (the first organo-transition metal compound) is the lowest. The third and the fourth organo-transition metal compounds include rigidly-bridged ansa-metallocenes in which one or two aryl groups, specifically one or two phenyl groups are bonded to a bridging atom linking ligands, but not limited by the above.

Non-limiting examples of the third organo-transition metal compound of Formula 3 and the fourth organo-transition metal compound of Formula 4 include rac-ethylene bis(1-indenyl) zirconium dichloride, rac-ethylene bis(1-tetrahydro-indenyl) zirconium dichloride, rac-dimethylsilanediylbis (2-methyl-tetrahydrobenzindenyl) zirconium dichloride, rac-dimethylsilanediylbis (2-methyl-4,5-tetrahydrobenzindenyl) zirconium dichloride, rac-diphenylsilanediylbis(2-methyl-5,6-cyclopentadienylindenyl) zirconium dichloride, rac-dimethylsilylbis(2-methyl-4-phenylindenyl) zirconium dichloride, rac-diphenyl silylbis (2-methyl-4-phenylindenyl) zirconium dichloride, isopropylidene (cyclopentadienyl) (9-fluorenyl) zirconium dichloride, diphenylsilyl (cyclopentadienyl) (9-fluorenyl) zirconium dichloride, diphenylmethylidene (cyclopentadienyl) (2,7-di-tert-butylfluoren-9-yl) zirconium dichloride, diphenylmethylidene (3-tert-butylcyclopentadienyl) (2,7-di-tert-butylfluoren-9-yl) zirconium dichloride, diphenylmethylidene (3-tert-butyl-5-methylcyclopentadienyl) (2,7-di-tert-butylfluoren-9-yl) zirconium dichloride, 1,2-ethylenebis (9-fluorenyl) zirconium dichloride, rac-[1,2-bis (9-fluorenyl)-1-phenyl-ethane] zirconium dichloride, iso-propylidene (2-phenyl-cyclopentadienyl) (9-fluorenyl) zirconium dichloride, diphenylmethylidene (2-phenyl-cyclopentadienyl) (9-fluorenyl) zirconium dichloride, iso-propylidene(2-phenyl-cyclopentadienyl) (2,7-di-tert-butylfluoren-9-yl) zirconium dichloride, diphenylmethylidene (2-phenyl-cyclopentadienyl) (2,7-di-tert-butylfluoren-9-yl) zirconium dichloride, [(4-(fluorenyl)-4,6,6-trimethyl-2-(p-tolyl)-tetrahydropentrene] zirconium dichloride, [(isopropylidene-(2-(p-tolyl)-cyclopentadienyl)-(9-fluorenyl)] zirconium dichloride, isopropylidene (2-(m-tolyl)-cyclopentadienyl)-(9-fluorenyl)] zirconium dichloride, [diphenylmethylidene (2-(m-tolyl)-cyclopentadienyl)-(9-fluorenyl)] zirconium dichloride, isopropylidene (2-(m-tolyl)-cyclopentadienyl)(2,7-di-tert-butylfluoren-9-yl)] zirconium dichloride, [diphenylmethylidene(2-(m-tolyl)-cyclopentadienyl) (2,7-di-tert-butylfluoren-9-yl)] zirconium dichloride, [isopropylidene (2-(o-tolyl)-cyclopentadienyl) (9-fluorenyl)] zirconium dichloride, [4-(fluorenyl)-4,6,6-trimethyl-2-(2,4-dimethylphenyl)-tetrahydropentalene] zirconium dichloride, [isopropylidene (2-(2,3-dimethylphenyl)-cyclopentadienyl) (9-fluorenyl)] zirconium dichloride, isopropylidene (2-(2,4-dimethylphenyl)-cyclopentadienyl) (9-fluorenyl)] zirconium dichloride, [diphenylmethylidene (2-(2,3-dimethylphenyl)-cyclopentadienyl) (9-fluorenyl)] zirconium dichloride, [diphenylmethylidene (2-(2,4-dimethylphenyl)-cyclopentadienyl) (9-fluorenyl)] zirconium dichloride, [isopropylidene (2-(2,3-dimethylphenyl)-cyclopentadienyl)(2,7-di-tert-butylfluoren-9-yl)] zirconium dichloride, [isopropylidene(2-(2,4-dimethylphenyl)-cyclopentadienyl)(2,7-di-tert-butylfluoren-9-yl)] zirconium dichloride, [diphenylmethylidene(2-(2,3-dimethylphenyl)-cyclopentadienyl)(2,7-di-tert-butylfluoren-9-yl)] zirconium dichloride, [diphenylmethylidene (2-(2,4-dimethylphenyl)-cyclopentadienyl)(2,7-di-tert-butylfluoren-9-yl)] zirconium dichloride, [4-(fluorenyl)-4,6,6-trimethyl-2-(difluorophenyl)-tetrahydropentalene] hafnium dichloride, isopropylidene(2-tetramethylphenyl-cyclopentadienyl)(9-fluorenyl) zirconium dichloride, isopropylidene(2-(2,6-dimethylphenyl)-cyclopentadienyl)(9-fluorenyl) zirconium dichloride, isopropylidene(2-(3,5-dimethylphenyl)-cyclopentadienyl)(9-fluorenyl) zirconium dichloride, isopropylidene(2-(2,3-dimethoxyphenyl)-cyclopentadienyl)(9-fluorenyl) zirconium dichloride, isopropylidene(2-(chlorophenyl)-cyclopentadienyl)(9-fluorenyl) zirconium dichloride, isopropylidene(2-(pentafluorophenyl)-cyclopentadienyl)(9-fluorenyl) zirconium dichloride, isopropylidene(2-(tert-butylphenyl)-cyclopentadienyl)(9-fluorenyl) zirconium dichloride, isopropylidene(2-(biphenyl)-cyclopentadienyl) (9-fluorenyl) zirconium dichloride, isopropylidene(2-(3,5-diphenyl-phenyl)-cyclopentadienyl)(9-fluorenyl) zirconium dichloride, isopropylidene(2-naphthyl-cyclopentadienyl)(9-fluorenyl) zirconium dichloride, diphenylmethylidene(2-tetramethylphenyl-cyclopentadienyl)(9-fluorenyl) zirconium dichloride, diphenylmethylidene(2-(2,6-dimethylphenyl)-cyclopentadienyl)(9-fluorenyl) zirconium dichloride, diphenylmethylidene(2-(2,4-dimethoxyphenyl)-cyclopentadienyl) (9-fluorenyl) zirconium dichloride, diphenylmethylidene(2-(chlorophenyl)-cyclopentadienyl) (9-fluorenyl) zirconium dichloride, diphenylmethylidene(2-(fluorophenyl)-cyclopentadienyl)(9-fluorenyl) zirconium dichloride, diphenylmethylidene(2-(pentafluorophenyl)-cyclopentadienyl)(9-fluorenyl) zirconium dichloride, diphenylmethylidene(2-(tert-butylphenyl)-cyclopentadienyl)(9-fluorenyl) zirconium dichloride, diphenylmethylidene(2-(3,5-di-tert-butylphenyl)-cyclopentadienyl)(9-fluorenyl) zirconium dichloride, diphenylmethylidene(2-(biphenyl)-cyclopentadienyl)(9-fluorenyl) zirconium dichloride, diphenylmethylidene(2-naphthyl-cyclopentadienyl)(9-fluorenyl) zirconium dichloride and so on. The third and fourth organo-transition metal compounds may be used independently or in combination of two or more of the above compounds.

The aluminoxane serves as an activator and for removing impurities. For example, aluminoxane represented by the following formula 5 can be used, and may have a linear, cyclic or network structure. The linear aluminoxane may be represented by the following formula 6, and the cyclic aluminoxane may be represented by the following formula 7.

[Formula 5]

[Formula 6]

[Formula 7]

In Formulas 5 to 7, R' is a hydrocarbyl group, preferably a linear or branched alkyl group having 1 to 10 carbon atoms, and most preferably R' is a methyl group, x is an integer of 1 to 70, preferably an integer of 1 to 50, more preferably an integer of 10 to 40, and y is an integer of 3 to 50, preferably an integer of 10 to 40.

In the present invention, commercially available alkyl aluminoxanes can be used. Non-limiting examples of the alkyl aluminoxane include methylaluminoxane, ethylaluminoxane, butylaluminoxane, isobutylaluminoxane, hexylaluminoxane, octylaluminoxane, decylaluminoxane, and the like. The aluminoxane is commercially available in the form of various types of hydrocarbon solutions. Among them, aluminoxane of aromatic hydrocarbon solution is preferably used, and aluminoxane solution dissolved in toluene is more preferably used. The aluminoxane used in the present invention can be used alone or in combination of two or more. The alkylaluminoxane may be prepared in a conventional manner by adding an appropriate amount of water to the trialkylaluminum or by reacting a hydrocarbon compound or an inorganic hydrate containing water with trialkylaluminum. Generally, a mixture of linear and cyclic aluminoxane is obtained.

In the catalyst for olefin polymerization used in the present invention, with respect 1 mole of the first organo-transition metal compound represented by Formula 1, the amount of the second organo-transition metal compound represented by Formula 2 is preferably 0.01 to 100 moles, preferably 0.1 to 20 moles, more preferably 0.5 to 10 moles, the amount of the third organo-transition metal compound represented by Formula 3 is preferably 0.01 to 100 moles, preferably 0.1 to 20 moles, more preferably 0.5 to 10 moles and the amount of the fourth organo-transition metal compound represented by Formula 4 is preferably 0.01 to 100 moles, preferably 0.1 to 20 moles, more preferably 0.5 to 10 moles. If the amount of the first organo-transition metal compound represented by the formula 1 is too small, a polymer having a high molecular weight may be predominantly produced. If the amount of the first organo-transition metal compound is too high, a polymer having a low molecular weight may be predominantly produced.

The amount of aluminoxane is used such that the amount of aluminum in aluminoxane is 1 to 100,000 moles, preferably 1 to 5,000 moles, more preferably 1 to 2,500 moles, with respect to 1 mole of sum of the first organo-transition metal compound represented by the formula 1, the second organo-transition metal compound represented by the formula 2, the third organo-transition metal compound represented by the formula 3, and the fourth the first organo-transition metal compound represented by the formula 4. For example, the first to fourth organometallic compounds of transition metals and aluminoxane are mixed so that 1 to 100,000 moles, preferably 1 to 5,000 moles, of aluminum is used per mole of the total organometallic compounds of transition metals, then the catalyst for olefin polymerization of the present invention is produced.

The mixture of the catalyst component composition can be made without specific limitations. For example, the organometallic compounds (first to fourth organometallic compounds of transition metals) and aluminoxane are mixed simultaneously for 5 minutes to 24 hours, preferably 15 minutes to 16 hours. Alternatively, the first organic transition metal compounds and the aluminoxane are mixed first for 5 minutes to 24 hours, preferably for 15 minutes to 16 hours. The second organic transition metal compounds and the aluminoxane are mixed for 5 minutes to 10 hours, preferably for 15 minutes to 4 hours. Then the second mixture is mixed with the first mixture for 5 minutes to 24 hours, preferably for 15 minutes to 16 hours. The third organic transition metal compounds and the aluminoxane are mixed for 5 minutes to 10 hours, preferably for 15 minutes to 4 hours and then the third mixture is mixed with the first and the second mixtures for 5 minutes to 24 hours, preferably for 15 minutes to 16 hours. Finally the fourth organic transition metal compounds and the aluminoxane are mixed for 5 minutes to 10 hours, preferably for 15 minutes to 4 hours and the fourth mixture is mixed with the first, second and third mixtures for 5 minutes to 24 hours, preferably for 15 minutes to 16 hours. It is desirable that the compounds should be mixed under an inert atmosphere of nitrogen or argon, without a solvent, or in the presence of an inert hydrocarbon solvent such as heptane, hexane, benzene, toluene, xylene or mixtures thereof. The temperature of the mixing process is 0 to 150° C., preferably 10 to 100° C. The catalyst solution in which the catalyst is uniformly dissolved in the hydrocarbon solvent can be used as it stands, or the catalyst in a solid powder state after the solvent has been removed can be used. The catalyst in a solid powder state can be prepared by carrying out a precipitation reaction of the catalyst solution, and solidifying the precipitate from the reaction.

The olefin polymerization catalyst composition according to the present invention may further comprise an organic or inorganic carrier which supports mixture of the organometallic compound, the first to fourth organo-transition metal compounds, and the aluminoxane. Therefore, the catalyst composition of the present invention can exist in a form supported by an organic or inorganic carrier or a form of an insoluble particle of the carrier (silica, alumina, silica-alumina mixture, etc.), as well as a form of a solid powder or a homogeneous solution. The method for contacting the catalyst composition of the present invention with the carrier will be explained, but the present invention is not limited to the following methods. At first, a solution state catalyst is prepared by mixing the organometallic compound represented, the first to fourth organo-transition metal compounds and the aluminoxane is contacted with a porous carrier (for example, a silica carrier having pore sizes of 50 to 500 Å and a pore volume of 0.1 to 5.0 cm$^3$/g) to form a slurry. Next, the catalyst of the slurry state is treated with an acoustic wave or oscillating wave having the frequency of 1 to 10.000 kHz, preferably 20 to 500 kHz at 0° C. to 120° C., preferably 0° C. to 80° C. for 0.1 to 6 hours, preferably 0.5 to 3 hour, to uniformly infiltrate the catalyst components into the pores of the carrier. And then, the catalyst slurry is dried under vacuum or nitrogen flow to form a catalyst of a solid powder state. The acoustic wave or oscillating wave is preferably ultrasonic waves. After applying the acoustic wave or the oscillating wave to the catalyst, the step of supporting the catalyst on a carrier may also include the step of washing the supported catalyst with a hydrocarbon selected from the group consisting of pentane, hexane, heptane, isoparaffin, toluene, xylene and mixtures thereof.

As the porous carrier, porous inorganic compounds, inorganic salts, and organic compounds with micro pores and a large surface area can be used without restrictions. The shape of the inorganic carrier is not limited if the shape can be maintained during the preparation process of the supported catalysts, and may be in any shape such as powder, particle, flake, foil, fiber, and so on. Regardless of the shape of the inorganic carrier, the maximum length of the inorganic carrier is generally from 5 to 200 μm, preferably from 10 to 100 μm, the preferable surface area of the inorganic carrier is 50 to 1,000 m$^2$/g and the preferable pore volume is 0.05 to 5 cm$^3$/g. Generally, the inorganic carrier should be treated to remove water or hydroxyl group therefrom before the use. The treatment can be carried out by calcining the carrier at 200° C. to 900° C. under an inert atmosphere such as air, nitrogen, argon, or so on. Non-limiting examples of the inorganic salt carrier or the inorganic carrier include silica, alumina, bauxite, zeolite, magnesium chloride ($MgCl_2$), calcium chloride ($CaCl_2$), magnesium oxide (MgO), zirconium dioxide ($ZrO_2$), titanium dioxide ($TiO_2$), boron trioxide ($B_2O_3$), calcium oxide (CaO), zinc oxide (ZnO), barium oxide (BaO), thorium oxide ($ThO_2$) and mixtures thereof such as silica-magnesium oxide ($SiO_2$-MgO), silica-alumina ($SiO_2$—$Al_2O_3$), silica-titanium dioxide ($SiO_2$—$TiO_2$), silica-vanadium pentoxide ($SiO_2$—$V_2O_5$), silica-chromium trioxide ($SiO_2$—$CrO_3$), silica-titanium dioxide-magnesium oxide ($SiO_2$—$TiO_2$—MgO) or so on. Small amount of carbonate, sulfate, or nitrate can be added to these compounds. Non-limiting examples of the organic carrier include starch, cyclodextrin, synthetic polymer or so on. Examples of the solvent, which is used for bringing the catalyst of the present invention into contact with the carrier, include an aliphatic hydrocarbon solvent such as pentane, hexane, heptane, octane, nonane, decane, undecane, dodecane and so on, an aromatic hydrocarbon solvent such as benzene, monochlorobenzene, dichlorobenzene, trichlorobenzene, toluene and so on, a halogenated aliphatic hydrocarbon solvent such as dichloromethane, trichloromethane, dichloroethane, trichloroethane, and so on. When the olefin polymerization catalyst composition according to the present invention is supported in the carrier, each components of the olefin polymerization catalyst composition is the same in the solution or solid state. The carrier amount of aluminum in the olefin polymerization catalyst composition is 5 to 30 weight part, preferably 7 to 20 weight part with respect to 100 weight part of the carrier, and the carrier amount of the transition metal compound in the olefin polymerization catalyst composition is 0.01 to 2 weight part, preferably 0.05 to 1.5 weight part with respect to 100 weight part of the carrier.

Next, the present olefin polymerization process will be described. The olefin polymerization catalyst composition of the present invention can exist in a form supported by an inorganic or organic carrier or a form of an insoluble particle of the carrier, as well as a form of a homogeneous solution. Thus, the olefin polymerization catalyst composition can be used for a solution phase, a slurry phase, a bulk phase or a gas phase polymerization reaction. The conditions for the polymerization reactions can be varied according to the state of the catalyst (homogeneous or heterogeneous phase (supported phase)), the polymerization method (solution polymerization, slurry polymerization, gas phase polymerization), target polymer properties or the polymer shape. When the polymerization is carried out in a solution phase or a slurry phase, a solvent or olefin itself may work as a reaction medium. Examples of the solvent include propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and so on, and, if necessary, mixtures of the solvents can be used. In the polymerization or copolymerization of olefin according to the present invention, the amount of the first to fourth organometallic compounds of transition metals used is not limited especially. However, the concentration of the central metal of the first to fourth organo-transition metal compounds is preferably $10^{-8}$ to 10 mol/l, and more preferably $10^{-7}$ to $10^{-2}$ mol/l in a polymerization reaction system.

In the olefin polymerization or copolymerization of the present invention, the polymerization temperature is generally 70 to 110□, which is not especially limited because it can be varied according to reactants, reaction conditions, and so on. However, the polymerization temperature is generally 0 to 250□, and more preferably 10 to 200□ in a solution polymerization, and generally 0 to 120□, and more preferably 20 to 110□ in a slurry or a gas phase polymerization. The polymerization pressure is generally atmospheric pressure to 500 kgf/cm², preferably atmospheric pressure to 60 kgf/cm², more preferably 10 to 60 kgf/cm². The polymerization reaction can be carried out in a batch type, a semi-continuous type, or a continuous type reaction. The polymerization can be carried out by two or more steps of different reaction conditions. The molecular weight and molecular weight distribution of the resulting polymer can be controlled by changing the polymerization temperature, or by injecting hydrogen into a reactor. The polyolefin resin polymerization of the present invention can be carried out by using a conventional single loop reactor, gas phase reactor, ICFB (internally circulating fluidized-bed) reactor (Referring to Korean Patent Nos. 10-981612, 10-999543 and 10-999551 etc).

The olefin polymerization catalyst composition of the present invention can be used not only in a main polymerization of olefin monomers but also in a prepolymerization of olefin monomers. In the prepolymerization process, the olefin polymer or copolymer is produced in the amount of 0.05 to 500 g, preferably 0.1 to 300 g, and more preferably 0.2 to 100 g with respect to 1 g of the catalyst. Examples of the olefin suitable for the prepolymerization, include α-olefin of 2 to 20 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, and so on. And it is preferable that olefin for the prepolymerization is the same one for the main polymerization.

Hereinafter, the preferable examples are provided for better understanding of the present invention. However, the present invention is not limited to the following examples.

In the following examples, the olefin polymerization catalyst was produced with Schlenk method in which air and moisture were completely blocked, and purified and dried nitrogen was used as an inert gas. Solvent was dried with sodium metal under inert nitrogen atmosphere. In the specification and the Examples, Low molecular weight content was measured as follows.

Low molecular weight content (LMW, %): Low molecular weight polymer portion is extracted from the GPC molecular weight distribution curve by using the Gaussian law, and the low molecular weight polymer content is calculated with a program (Origin Pro 8.6).

[Preparation Example 1] Preparation of Catalyst

To a 150 L reactor under the nitrogen atmosphere were added bis(isobutylcyclopentadienyl)zirconium dichloride ((iBuCp)$_2$ZrCl$_2$) as a first organic transition metal compound, bis(2-n-butylindenyl) zirconium dichloride ((2-n-BuInd)$_2$ZrCl$_2$) as a second organic transition metal compound, dimethyl silyl(4,7-di-methylinde-1-nyl)(2,3,4,5-tetramethylcyclopentadie-1-nyl) zirconium dichloride (Me$_2$Si(4,7-diMeInd)(2,3,4,5-tetraMeCp)) ZrCl$_2$) as a third organic transition metal compound, diphenylmethylidene(n-butylcyclopentadienyl)(2,7-di-tert-butylfluorene-9-yl)zirconium dichloride (Ph$_2$C(2,7-t-BuFlu) (n-Bu-Cp) ZrCl$_2$) as a fourth organic transition metal compound, and methylaluminoxane (MAO, Albemarle Corp., 10% toluene solution) as aluminoxane. The resultant mixture was stirred at 60° C. for 60 minutes to prepare a solution. The solution was mixed with silica (SiO$_2$) which is heat-treated at 250° C., subjected to ultrasound for one hour and then removed of the supernatant. The remaining solid was washed with hexane twice and dried out to obtain a supported catalyst in the form of a freely flowing solid powder.

[Preparation Example 2] Process of Forming a Film

A film was prepared with MUMAC blown film processing machine (Dukyoung Machinery Co., Ltd.) with pellets of 5 kg. The processing conditions were as follows: temperature: 200□, screw rpm: 90, BUR (4:1): 31.4 cm, FLH: 46 cm, thickness of film: 25 μm.

[Examples 1 to 3] Ethylene/1-Hexene Copolymerization and Evaluation of Processability and Physical Properties of Copolymer The copolymerization method was applied according to the polymerization method of the continuous single-loop process well known to those skilled in the art. The hybrid supported metallocene catalyst obtained in the Preparation Example 1 was continuously added at a rate of 1.5 g/h in the single-loop slurry polymerization process, and 1-hexene was used as a comonomer to prepare polyethylene. More specifically, isobutane was filled in a 53 L single-loop reactor, and ethylene, hexane-1 and the catalyst were then continuously added into the reactor controlled to the conditions of Table 1 to continuously obtain the polyethylene.

An additive such as an antioxidant was added to the polyethylene copolymer thus obtained, and a twin-screw extruder (W&P, 75 pi, L/D=36) was used at extrusion temperature of 170 to 220° C. to form granules. The properties of the polyethylene polymer (i.e., weight average molecular weight (Mw)/1000), melt index (MIP, MIF), shear response (SR, MIF/MIP), and density) were evaluated and set forth in Table 1.

TABLE 1

| Item | Example 1 | Example 2 | Example 3 |
|---|---|---|---|
| Polymerization temp. (° C.) | 81.5 | 80 | 79.5 |
| Ethylene content (mol. %) | 8.5 | 8 | 8 |
| 1-hexene content (wt. %) | 0.4 | 0.4 | 0.4 |
| Hydrogen (mg/kg C2) | 350 | 350 | 350 |
| Mileage (gPE/gCat) | 3,200 | 2,600 | 2,000 |
| Mw/1000 | 199 | 229 | 216 |
| MWD | 14.4 | 17.1 | 21.9 |
| Molecular weight distribution | Bimodal | Bimodal | Bimodal |
| Content (wt %) of polymer with Mw of 10,000 or less | 13.9 | 14.6 | 17.1 |
| Content (wt. %) of polymer with Mw of 1,000,000 or greater | 7.1 | 8.9 | 8.5 |
| MIP | | 0.418 | 0.13 | 0.167 |
| MIF | 6.78 | 4.32 | 5.38 |
| SR (F/P) | 16.2 | 33.8 | 32.2 |
| Density | 0.9516 | 0.9519 | 0.9532 |

[Comparative Examples 1, 2 and 3] Commercially Available Polyethylene

Three polyethylene products commercially available (Comparative Examples 1, 2 and 3) were compared with the polyethylene of the example 2 in regards to properties and processability under the same conditions. The comparative example 1 was XP4100 high-density polyethylene supplied from Daelim Industrial Co., Ltd.; the comparative example 2 was 7000F high-density polyethylene prepared by Lotte Chemicals Co., Ltd.; and the comparative example 3 was LH8300 high-density polyethylene produced by Daelim Industrial Co., Ltd.

[Experimental Example 1] Evaluation on Properties of Polyethylene

For the polymer prepared in the example 2 and the products of the comparative examples 1, 2 and 3, the basic properties and the resin properties are presented in Tables 2 and 3, respectively, and the correlation between melt strength and matrix index is shown in Table 4. In this regard, dw/d log M(L) is the height of a peak having the lowest molecular weight in the molecular weight distribution graph obtained by the gel permeation chromatography (GPC); dw/d log M(H) is the height (content) of a peak having the highest molecular weight; and dw/d log M(M) is the height of the deepest valley between the two peaks.

TABLE 2

| Div. | Item | Example 2 | Comparative Example 1 | Comparative Example 2 | Comparative Example 3 |
|---|---|---|---|---|---|
| Component | Type | Metallocene | Metallocene | Z/N | Z/N |
| Basic properties | MIP, g/10 min | 0.13 | 0.19 | 0.19 | 0.28 |
| | SR (F/E) | 33.8 | 25.1 | 43 | 32 |
| | Density, g/cm3 | 0.9519 | 0.9491 | 0.9508 | 0.9521 |
| | MWD graph | Bimodal | bimodal | bimodal | bimodal |
| | Mw/1000 | 229 | 200 | 255 | 226 |
| | MWD (Mw/Mn) | 17.1 | 13.5 | 41.2 | 21.5 |
| | Content with Mw of 1,000,000 or greater, wt. % | 8.9 | 6.6 | 10.1 | 8.2 |
| | LMW % | 68 | 57 | 55 | 48 |
| | X/S | 0.97 | 0.63 | 2.02 | 2.29 |

TABLE 3

| Div. | Item | Example 2 | Comparative Example 1 | Comparative Example 2 | Comparative Example 3 |
|---|---|---|---|---|---|
| Film processability | Melt pressure, KG | 351 | 428 | 429 | 467 |
| | Motor load, A | 16.1 | 16.2 | 16.9 | 18.4 |
| Resin properties | STI (0.1/100) | 53.13 | 30.5 | 55.3 | 31.7 |
| | MRI (100/0.1) | 36.4 | 100.4 | 28.2 | 60.6 |
| | Melt strength (cN) | 4.7 | 3.22 | 3.9 | 2.6 |
| | Gel | 0/0/0/5 | 0/0/4/34 | 0/0/2/20 | 0/0/7/32 |

TABLE 4

| | Example | | | Comparative Example | | |
|---|---|---|---|---|---|---|
| | 2 | 4 | 5 | 1 | 4 | 5 |
| LMW | 68 | 68 | 60 | 57 | 60 | 60 |
| Mw/1000 | 229 | 216 | 202 | 200 | 263 | 231 |
| Mz/1000 | 1,404 | 1,374 | 1,091 | 942 | 1,419 | 951 |
| Mz + 1/1000 | 3,044 | 3,067 | 2,491 | 1,759 | 3,053 | 1,851 |

TABLE 4-continued

| | | | | | | |
|---|---|---|---|---|---|---|
| Mw > 1,000,000 | 8.9 | 8.46 | 6.68 | 6.6 | 10.3 | 5.56 |
| dw/dlogM(L) | 0.469 | 0.4641 | 0.4091 | 0.55 | 0.4611 | 0.5333 |
| dw/dlogM(M) | 0.3295 | 0.3079 | 0.3739 | 0.2479 | 0.3025 | 0.2577 |
| dw/dlogM(H) | 0.3563 | 0.3545 | 0.4106 | 0.4749 | 0.4535 | 0.4735 |
| Matrix index | 1.51 | 1.66 | 1.19 | 3.13 | 2.02 | 2.91 |
| Melt strength | 4.7 | 4.4 | 4.5 | 3.37 | 4.8 | 3.8 |

| | Comparative Example | | | | | |
|---|---|---|---|---|---|---|
| | 6 | 7 | 8 | 9 | 10 | 11 |
| LMW | 62 | 57 | 60 | 61 | 62 | 60 |
| Mw/1000 | 225 | 199 | 191 | 183 | 181 | 178 |
| Mz/1000 | 1,467 | 1,024 | 759 | 1,017 | 971 | 963 |
| Mz + 1/1000 | 3,060 | 2,097 | 1,360 | 2,115 | 2,014 | 1,921 |
| Mw > 1,000,000 | 9.43 | 6.87 | 4.11 | 6.33 | 5.96 | 5.94 |
| dw/dlogM(L) | 0.4945 | 0.5307 | 0.5387 | 0.5372 | 0.4907 | 0.4766 |
| dw/dlogM(M) | 0.2486 | 0.2524 | 0.2755 | 0.2605 | 0.2732 | 0.2525 |
| dw/dlogM(H) | 0.365 | 0.4467 | 0.4398 | 0.4009 | 0.4079 | 0.4072 |
| Matrix index | 2.46 | 2.87 | 2.55 | 2.6 | 2.29 | 2.5 |
| Melt strength | 3.44 | 3.9 | 2.8 | 3.4 | 2.8 | 2.5 |

The matrix index of Table 4 can be calculated according to the following Equation 1.

$$\text{Matrix Index} = (A+B-C)/C \quad \text{[Equation 1]}$$

where A is dw/d log M(L); B is dw/d log M(H); and C is dw/d log M(M).

Figure 1:
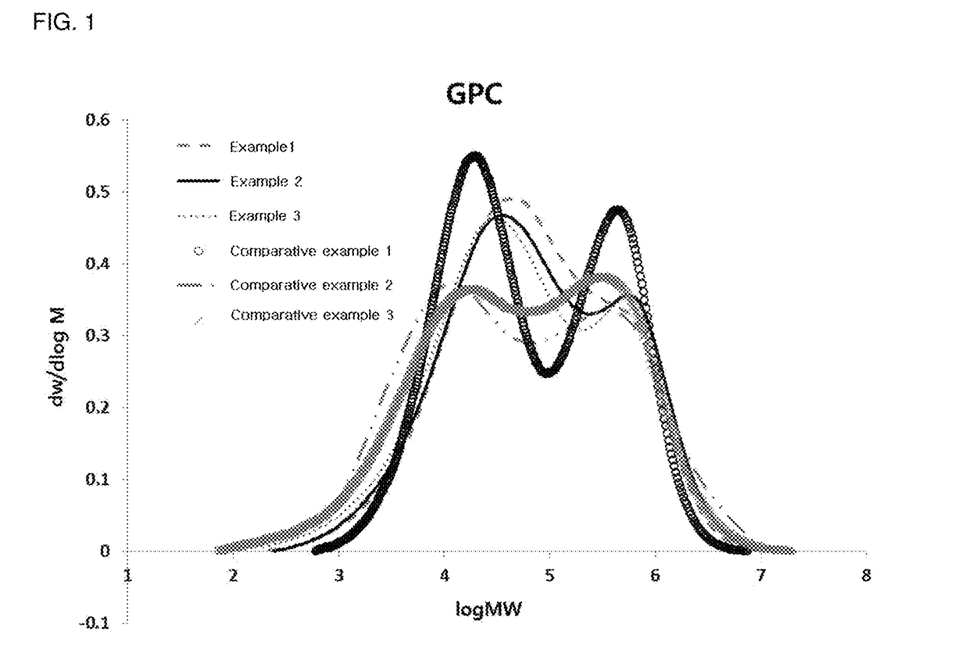
FIG. 1 is an illustration showing gel permeation chromatography (GPC)-based molecular weight distribution for the polyethylene products prepared in Examples 1, 2 and 3 of the present invention and Comparative Examples 1, 2 and 3.
Figure 2:
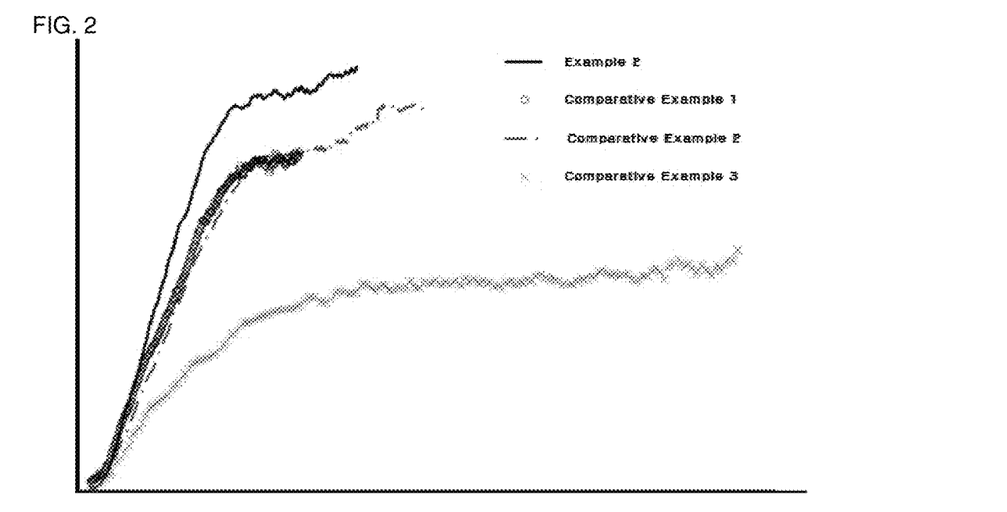
FIG. 2 is an illustration showing an analysis for the melt strength of the polyethylene products prepared in Example 2 of the present invention and Comparative Examples 1, 2 and 3.
Figure 3:
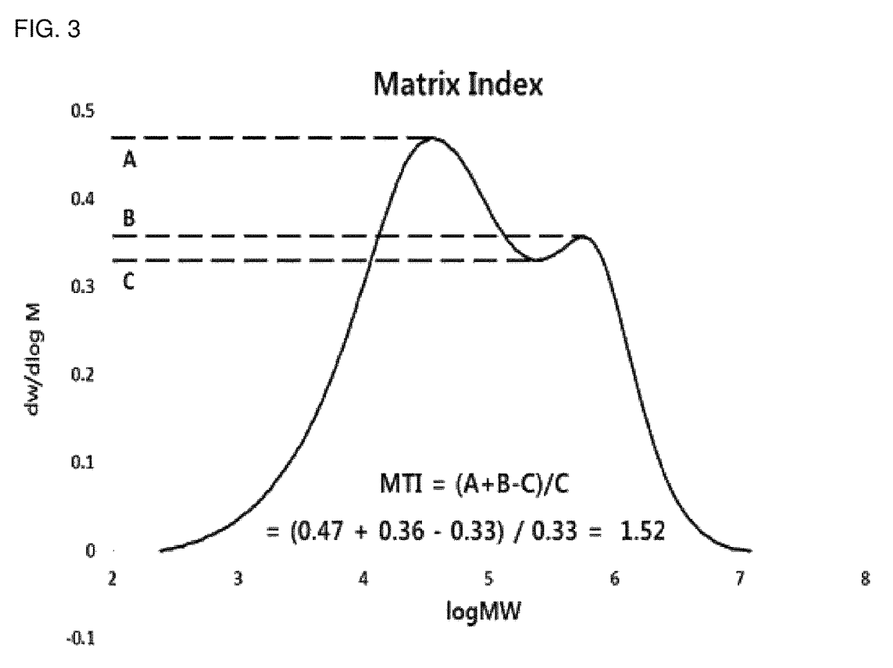
FIG. 3 is an illustration for calculating the matrix index of the polyethylene product prepared in Example 2 of the present invention.

FIG. 1 is an illustration showing gel permeation chromatography (GPC)-based molecular weight distribution for the polyethylene products prepared in Examples 1, 2 and 3 of the present invention and Comparative Examples 1, 2 and 3. FIG. 2 is an illustration showing an analysis for the melt strength of the polyethylene products prepared in Example 2 of the present invention and Comparative Examples 1, 2 and 3. FIG. 3 is an illustration for calculating the matrix index of the polyethylene product prepared in Example 2 of the present invention. As shown in FIGS. 1, 2 and 3, the polyethylene resin prepared in the presence of a metallocene catalyst, when used alone, may have good properties but poor processability due to its narrow molecular weight distribution. A solution to this problem is introducing a polyethylene resin having a multimodal molecular weight distribution. However, the polyolefin resin prepared in the presence of a hybrid metallocene catalyst produces polymer chains each having a different elastic energy because of its characteristic to produce polymer chains having a narrow molecular weight distribution. The polymer chains each having a different elastic energy is inclined to get apart from each other rather than mix together, which ends up forming a molded product of polyethylene with non-uniform distribution of polymer chains in an extruder. The polymer chains non-uniformly distributed in the molded product of polyethylene deteriorates the physical properties, processability and rheological properties of the polyethylene resin.

In order to compensate for this unfavorable factor of the multimodal polyethylene resin, the multimodal polyethylene resin of the present invention according to the Example 2 of FIG. 1 introduces a medium molecular weight capable of reducing the elastic energy difference into the bimodal polymer chains. As can be seen from FIG. 1, there is produced a multimodal polyolefin resin in which polymer chains are very uniformed distributed. The metallocene polyethylene resin having a very uniform distribution of low molecular weight chains and high molecular weight chains not only maintains its own good physical properties, but also displays high processability, high melt strength and good rheological properties. In FIGS. 1 and 3, log MW is the molecular weight; and dw/d log M is the weight fraction of a polymer chain having the corresponding molecular weight (log M).

The molecular weight distributions of the polyethylene products of the Examples 1, 2 and 3 of the present invention and the Comparative Examples 1, 2 and 3 are all bimodal, which is illustrated in FIG. 1. Particularly, the polyethylene products of the Examples 1, 2 and 3 prepared by a single process have a bimodal molecular weight distribution in which a medium molecular weight is introduced between the bimodal molecular weight distributions, as shown in FIG. 1. The polyethylene of the Comparative Example 1, prepared by a single process using a metallocene catalyst, has a molecular weight distribution with polymer chains each having a different elastic energy. The polyethylene products of the Comparative Examples 2 and 3, commercially prepared by a continuous polymerization process using an Z/N catalyst, has a bimodal molecular weight distribution with the medium molecular weight filled in.

Increasing the molecular weight of a polyethylene resin is a general method to enhance the properties of the polyethylene resin. In this case, the polyethylene has good properties relative to the polyethylene of the lower molecular weight but inevitably encounters deterioration in processability. Further, the molecular weight distribution (MWD) of the polyethylene resin prepared using a metallocene catalyst is very narrow. Referring to Table 2, the weight average molecular weight (Mw) of the polyethylene resin of the Example 2 is similar to or greater than those of the polyethylene resins of the Comparative Examples 1 and 3, commercially available. But, the polyethylene resin of the Example 2 has the higher melt flow index ratio (shear response, SR) than those of the Comparative Examples 1 and 2 and the wider molecular weight distribution (MWD) than the conventional multimodal polyethylene resin prepared using a metallocene catalyst. This implicitly shows that the polyethylene resin of the Examples 2 has the lower modulus index (G') under the same process conditions in the extrusion molding process. As can be seen from Table 3, the polyethylene resin of the Example 2 displays the lowest values of melt pressure and motor load even with the lowest melt flow index (MIP) and the weight average molecular weight which is not that low, so it can secure high productivity.

Further, increasing the bubble stability during the process of forming a blown film is a factor of considerably great importance in the aspect of the processability. A general method of enhancing the bubble stability is to increase the melt tension and melt strength. A comparison of resin properties in Table 3 shows that the polyethylene resin of the Example 2 has the higher melt strength than those of the Comparative Examples 1, 2 and 3. When forming a film, the polyethylene resin is melt down into a viscous polymer under the conditions of high temperature and high pressure in an extruder and discharged from the extruder in the form of a film. A low melt strength during a discharge from the extruder worsens the shaking under stress to have an adverse effect on the thickness derivation, appearance and dimensional stability of the film. The film-type molded product with a high melt strength displays high resistance to sagging under weight and distortion under stress during the molding process.

In addition, a known effective method of enhancing the melt strength is to increase the ultra-high molecular weight content. It is generally known that a polyethylene resin having an ultra-high molecular weight displays the higher melt strength and the lower processability than a polyethylene resin having a relatively low molecular weight. Further, when the polymer with extremely high molecular weight is not uniformly mixed or well dissolved, it may cause the formation of fish eyes or gel during the process of forming a film.

The present invention is another method of increasing the melt strength that is totally different from the existing method involving an increase of the ultra-high molecular weight content. By introducing a polyethylene resin of the medium molecular weight, the present invention has developed a polyethylene resin with higher melt strength and better processability. As can be seen from Table 3, a comparison between the Example 2 and the Comparative Example 2 shows that the polymer of the Comparative Example 2 has the higher weight average molecular weight and the higher content of the ultra-high polymer but displays the lower melt strength than that of the Example 2. Further, the polymer of the Example 2 is far superior in the melt strength to that of the Comparative Example 3 having an equivalent level of weight average molecular weight and ultra-high polymer content.

Table 4 presents comparative examples with the melt strength increased by the introduction of the medium molecular weight. The matrix index (MTI) of Table 4 is an index representing the content of the medium molecular weight filled between high molecular weight and low molecular weight. The matrix index closer to 1 indicates that the polyethylene resin has the higher content of the medium molecular weight. All the comparative examples of Table 4 are polyethylene resins prepared in the presence of a metallocene catalyst. Particularly, all the polyethylene resins of the Examples 2, 4 and 5 are those prepared from polymerization using a same metallocene catalyst and provided with the medium molecular weight. A comparison between the Example 2 and the Comparative Examples 5 and 6 shows that even with a similar weight average molecular weight, the polyethylene resin of the Example 2 of the highest matrix index has the highest melt strength. Further, the polyethylene resin of the Example 2 is superior in melt strength to that of the Comparative Example 4 having the higher weight average molecular weight and the higher content of the ultra-high molecular weight. Furthermore, the polyethylene resins of the Examples 4 and 5 with relatively high matrix index are far superior in melt strength to those of the comparative examples having a similar weight average molecular weight and a similar content of the ultra-high molecular weight.

As can be seen from a comparison of resin properties in Table 3, the polyethylene resin of the Example 2 according to the present invention has the higher viscosity ratio (shear thinning index (STI)) than those of the Comparative Examples 1 and 3. The viscosity ratio (shear thinning index (STI)) indicates the viscosity with respect to the shear rate measured by RMS. A commonly used method of increasing the viscosity ratio (shear thinning index (STI)) is increasing the ultra-high polymer portion or introducing a long-chain branch (LCB). But, the present invention has developed a method of increasing the viscosity ratio (shear thinning index (STI)) by introducing the medium molecular weight rather than using the two conventional methods. The higher viscosity ratio (STI) indicates the higher viscosity in the higher processing region and the lower viscosity in the lower processing region. In other words, compared with the polyethylene resins of the Comparative Examples 1 and 3, the resin of the Example 2 has the lower viscosity in the extruder under the same process conditions to secure the higher fluidity and displays the higher viscosity when discharged from the extruder, ending up having less deformation.

It is of great importance to prevent the formation of gel on the surface of the film in the process of forming a film. In particular, as described above, the multimodal polyethylene resin has low molecular weight chain and high molecular weight chain move apart from each other in the extruder because of the elastic energy difference between them. Such a movement of the chains prevents the polyethylene resins from completely mixing together in the extruder, and the unmixed polymer resins are present as gel during the process of forming a film. In order to reduce the elastic energy difference, the present invention introduces a polyethylene resin having the medium molecular weight that is in the middle between low molecular weight and high molecular weight, thereby making the polymer chains uniformly mix together. The ability of inhibiting the formation of gel is thus increased as shown in Table 3. The polyethylene resin of the Example 2 according to the present invention is superior in the gel-inhibitory ability to those of the Comparative Examples 1 to 3.

In summary, the polyethylene resin of the present invention has a uniform distribution of the polymer chains and a considerably high matrix index in relation to the conventional multimodal polyethylene resin prepared by a polymerization process using a metallocene catalyst. The multimodal polyolefin resin of the present invention provides a polyolefin resin containing low molecular polymer and high molecular polymer completely mixed together due to its low elastic energy difference during the process of forming a film. Relative to the conventional polyethylene products, the polyethylene resin of the present invention has high melt strength and hence high process stability (i.e., bubble stability) during the process of forming a film. Further, the resin of the present invention is superior in shear thinning index (STI) and displays the lower modulus index (G') in the higher process region under the same conditions during the process of forming a film and the higher modulus index when discharged from the extruder. The low melt pressure during the process leads to high productivity. This shows that the polyethylene resin of the present invention relative to the existing polyolefin resins displays high moldability and process stability (bubble stability) as well as good properties and increases the productivity to make molded products with the consumption of a same level of energy.

In brief, the present invention is directed to prepare a polyethylene resin capable of securing high melt strength but high moldability and good mechanical properties by increasing the matrix index without an introduction of long-chain branch or ultra-high molecular weight.

The invention claimed is:

1. A polyolefin resin satisfying all the following requirements (1) to (5):
   (1) being polymerized in the presence of metallocene compounds represented by following formulas 1 to 4 as catalysts, $(L^1)(L^2)(X^1)(X^2)M^1$           [Formula 1]

$(L^3)(L^4)(X^3)(X^4)M^2$           [Formula 2]

$(L^5\text{-}Q^1_n\text{-}L^6)(X^5)(X^6)M^3$           [Formula 3]

$(L^7\text{-}Q^2_n\text{-}L^8)(X^7)(X^8)M^4$           [Formula 4]

wherein, $M^1$, $M^2$, $M^3$ and $M^4$ each is independently titanium (Ti), zirconium (Zr), or hafnium (Hf), $L^1$, $L^2$, $L^3$, $L^4$, $L^5$, $L^6$, $L^7$ and $L^8$ each is independently a cyclic hydrocarbyl group having 5 to 30 carbon atoms and having at least two conjugated double bonds, and $X^1$, $X^2$, $X^3$, $X^4$, $X^5$, $X^6$, $X^7$ and $X^8$ each is independently a halogen atom or a hydrocarbyl group, $Q^1$ and $Q^2$ each is independently a silane group or a hydrocarbyl group containing a substituent, and n is an integer of 1 to 5;
   (2) having a matrix index of 2 or less and a melt strength of 4.0 Force (cN) or greater measured at 190° C., wherein the matrix index is calculated according to the following equation 1;

Matrix Index=$(A+B-C)/C$           [Equation 1]

wherein A is the height of a peak having the lowest molecular weight in the molecular weight distribution graph measured by gel permeation chromatography; B is the height of a peak having the highest molecular weight; and C is the height of the deepest valley between the two peaks, wherein the matrix index approaches 1 as the medium molecular weight fills up between the bimodal molecular weights;
   (3) having a melt flow index (MIP, 190° C., 5.0 kg load condition) of 0.01 to 5.0 g/10 min;
   (4) having a ratio (Mw/Mn, MWD) of weight average molecular weight (Mw) to number average molecular weight (Mn) in the range from 5 to 35 as measured by gel permeation chromatography; and
   (5) having bimodal or multimodal peaks in a weight average molecular weight distribution measured by gel permeation chromatography, wherein the height ratio of two peaks (the ratio of the height of low molecular weight peak to the height of high molecular weight peak) is 0.7 to 3.

2. The polyolefin resin as claimed in claim 1, further satisfying all the following requirements (7), (8) and (9):
   (7) having a density (d) of 0.930 to 0.965 g/cm³;
   (8) having a peak ($M_{Lp}$) for the lowest molecular weight in the molecular weight distribution appearing in the molecular weight range of 10,000 to 100,000 according to gel permeation chromatography measurement; and
   (9) having a peak ($M_{Hp}$) for the highest molecular weight appearing in the molecular weight range of 300,000 to 3,000,000 according to gel permeation chromatography measurement.

3. The polyolefin as claimed in claim 1, wherein the polyolefin resin has a melt flow index of 15 to 50, and the melt flow index is defined as the ratio of high-load melt flow index (190° C., 21.6 kg/10 min load condition) to melt flow index (190° C., 5.0 kg load condition).

4. The polyolefin resin as claimed in claim 1, wherein the polyolefin resin has a shear thinning index of 45 to 100 measured at 190° C., and the shear thinning index is calculated according to the following Equation 2:

STI=$\eta_{0.1}/\eta_{100}$           [Equation 2]

where $\eta_{0.1}$ is a viscosity at deformation rate of 0.1 rad/s; and $\eta_{100}$ is a viscosity at deformation rate of 100 rad/s.

5. The polyolefin resin as claimed in claim 1, wherein the polyolefin resin has a modulus ratio index of 20 to 200, and the modulus ratio index is calculated according to the following Equation 3:

Modulus ratio index=$G'_{100}/G'_{0.1}$           [Equation 3]

wherein $G'_{100}$ is a storage modulus at deformation rate of 0.1 rad/s; and $G'_{0.1}$ is a storage modulus at deformation rate of 100 rad/s.

6. A polyolefin resin satisfying all the following requirements (1), (4), (5) and (6):
   (1) Being polymerized in the presence of metallocene compounds represented by following formulas 1 to 4 as catalysts, $(L^1)(L^2)(X^1)(X^2)M^1$           [Formula 1]

$(L^3)(L^4)(X^3)(X^4)M^2$           [Formula 2]

$(L^5\text{-}Q^1_n\text{-}L^6)(X^5)(X^6)M^3$           [Formula 3]

$(L^7\text{-}Q^2_n\text{-}L^8)(X^7)(X^8)M^4$           [Formula 4]

wherein, $M^1$, $M^2$, $M^3$ and $M^4$ each is independently titanium (Ti), zirconium (Zr), or hafnium (Hf), $L^1$, $L^2$, $L^3$, $L^4$, $L^5$, $L^6$, $L^7$ and $L^8$ each is independently a cyclic hydrocarbyl group having 5 to 30 carbon atoms and having at least two conjugated double bonds, and $X^1$, $X^2$, $X^3$, $X^4$, $X^5$, $X^6$, $X^7$ and $X^8$ each is independently a halogen atom or a hydrocarbyl group, $Q^1$ and $Q^2$ each is independently a silane group or a hydrocarbyl group containing a substituent, and n is an integer of 1 to 5;
   (4) The ratio (Mw/Mn, MWD) of weight average molecular weight (Mw) to number average molecular weight (Mn) is 5 to 35 measured by gel permeation chromatography;
   (5) In the weight average molecular weight distribution measured by gel permeation chromatography, bimodal or multimodal peaks appear, where the height ratio of the height of low molecular weight peak to the height of high molecular weight peak is 0.7 to 3;
   (6) In the correlation function of melt strength (Y) and matrix index (X), Y≥−0.74X+5.3, and the matrix index is calculated according to the following equation 1;

Matrix Index=$(A+B-C)/C$           [Equation 1]

wherein A is the height of a peak having the lowest molecular weight in the molecular weight distribution graph measured by gel permeation chromatography; B is the height of a peak having the highest molecular weight; and C is the height of the deepest valley between the two peaks, wherein the matrix index approaches 1 as the medium molecular weight fills up between the bimodal molecular weights.

7. The polyolefin resin as claimed in claim 6, wherein the polyolefin resin satisfies all the following requirements (3), (7), (8) and (9):
- (3) having a melt flow index (MIP, 190° C., 5.0 kg load condition) of 0.01 to 5.0 g/10 min;
- (7) having a density (d) of 0.930 to 0.965 g/cm³;
- (8) having a peak ($M_{Lp}$) for the lowest molecular weight in the molecular weight distribution appearing in the molecular weight range of 10,000 to 100,000 according to gel permeation chromatography measurement; and
- (9) having a peak ($M_{Hp}$) for the highest molecular weight appearing in the molecular weight range of 300,000 to 3,000,000 according to gel permeation chromatography measurement.

8. The polyolefin as claimed in claim 6, wherein the polyolefin resin has a melt flow index of 15 to 50, and the melt flow index is defined as the ratio of high-load melt flow index (190° C., 21.6 kg/10 min load condition) to melt flow index (190° C., 5.0 kg load condition).

9. The polyolefin resin as claimed in claim 6, wherein the polyolefin resin has a shear thinning index of 45 to 100 measured at 190° C., and the shear thinning index is calculated according to the following Equation 2:

$$STI = \eta_{0.1}/\eta_{100} \quad \text{[Equation 2]}$$

where $\eta_{0.1}$ is a viscosity at deformation rate of 0.1 rad/s; and $\eta_{100}$ is a viscosity at deformation rate of 100 rad/s.

10. The polyolefin resin as claimed in claim 6, wherein the polyolefin resin has a modulus ratio index of 20 to 200, and the modulus ratio index is calculated according to the following Equation 3:

$$\text{Modulus ratio index} = G'_{100}/G'_{0.1} \quad \text{[Equation 3]}$$

wherein $G'_{100}$ is a storage modulus at deformation rate of 0.1 rad/s; and $G'_{0.1}$ is a storage modulus at deformation rate of 100 rad/s.

11. A molded product comprising a polyolefin resin of claim 1, wherein the molded product is selected from the group consisting of a blow molded article, an inflated molded article, a cast molded article, an extruded laminated molded article, an extrusion molded article, a foamed molded article, an injection molded article, a sheet, a film, a fiber, a monofilament, and a nonwoven fabric.

12. A molded product comprising a polyolefin resin of claim 6, wherein the molded product is selected from the group consisting of a blow molded article, an inflated molded article, a cast molded article, an extruded laminated molded article, an extrusion molded article, a foamed molded article, an injection molded article, a sheet, a film, a fiber, a monofilament, and a nonwoven fabric.

* * * * *